April 6, 1926.
H. J. LE VESCONTE
TIRE STEM PRESSURE GAUGE
Filed Oct. 9, 1922
1,580,056
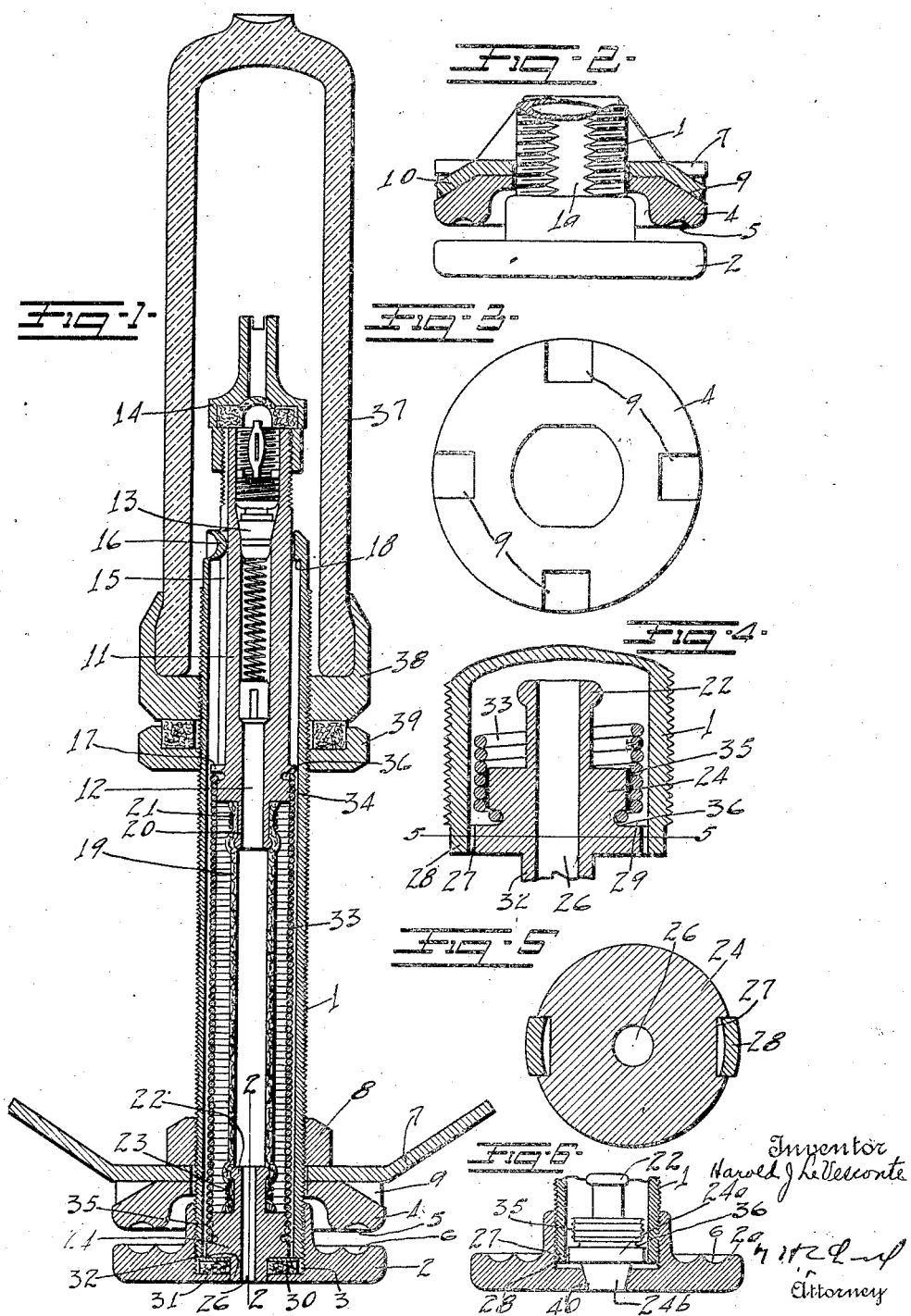

Patented Apr. 6, 1926.

1,580,056

UNITED STATES PATENT OFFICE.

HAROLD J. LE VESCONTE, OF CHARLESTON, WEST VIRGINIA, ASSIGNOR, BY MESNE ASSIGNMENTS, TO TIREGAGE VALVE CORPORATION, OF CHARLESTON, WEST VIRGINIA, A CORPORATION OF WEST VIRGINIA.

TIRE-STEM PRESSURE GAUGE.

Application filed October 9, 1922. Serial No. 593,196.

*To all whom it may concern:*

Be it known that I, HAROLD J. LE VESCONTE, a citizen of the United States, residing at Charleston, in the county of Kanawha and State of West Virginia, have invented new and useful Improvements in Tire-Stem Pressure Gauges, of which the following is a specification.

This invention is designed to improve pneumatic tire stems and particularly such stems as are provided with pressure gauges. One of the features of the invention relates to providing a spreader for a tire stem whereby it may be turned with relation to the tire stem so as to adapt it for different wheels. The invention further consists in improvements of a tire stem pressure gauge and generally consists in assembling the parts by providing an outwardly opening socket in the head of the stem into which the sleeve of the stem is secured. Other features of the invention will appear from the specification and claims.

The invention is illustrated in the accompanying drawings as follows:

Fig. 1 shows a central vertical section through the stem.

Fig. 2 a section on the line 2—2 in Fig. 1.

Fig. 3 a plan view of the clamping plate.

Fig. 4 a section of the anchor plate.

Fig. 5 a section on the line 5—5 in Fig. 4.

Fig. 6 is an alternative construction of the base.

1 marks the tire stem sleeve. This is screw-threaded throughout its length as is common and is provided with flats along the sides at 1ª. The head 2 has a screw-threaded socket 3 opening outwardly into which the sleeve 1 is screwed. After the assembly of the parts it is locked in this position either by spot welding or by crimping the wall of the socket against the flat 1ª. This permits of forming the sleeve with a continuous screw thread and simplifies the manufacture and at the same time simplifies the structure of the tire stem gauge. A clamping plate 4 has the usual corrugated surface 5 opposing the surface 6 on the head 2, the tire tube being clamped between these surfaces. A spreader 7 has the usual tapered ends and is secured on the plate 4 by a clamping nut 8. The plate 4 has the detents 9, preferably four of them, arranged at ninety degrees apart and the spreader has the tongues 10 stamped into it, these extending into the detents 9, thus locking the spreader plate against turning and permitting of the adjustment of the plate ninety degrees to adapt it for use with different wheels. The clamping plate 4 has its opening conforming to the sleeve 1 and is consequently locked against turning on said sleeve, the opening being clearly shown in Fig. 3. A plunger 11 is slidably mounted in the sleeve. It has a central opening 12 extending through it in which is arranged the usual inside valve 13. A cap 14 is screwed on to the outer end and these same screw threads are adapted to receive a pump connection when the cap is removed in the usual manner. The plunger has a key-way 15 which is engaged by a key or detent 16 in the sleeve and thus is locked against turning in the sleeve. The plunger is provided with a shoulder 17 which is adapted to engage an internal shoulder 18 on the end of the sleeve 1, thus preventing the disengagement of the plunger from the sleeve.

An extensible tube 19 preferably of rubber is arranged on a nipple 20 extending from the lower end of the plunger and is secured thereon by a wrapping of twine or similar material 21. The lower end of the tube extends over a nipple 22 and is secured thereon by a wrapping 23. The nipple is arranged on an anchor plate 24.

This anchor plate has an opening 26 extending through it completing the communication from the interior of the tire tube through the stem. It has slots 27 in its periphery which are engaged by projections 28 on the lower end of the sleeve 1, the lower end 29 of the sleeve otherwise seating on the top of the anchor plate so that as the sleeve 1 is screwed into the socket it seats the anchor plate and at the same time the anchor plate is locked against turning relatively to the sleeve. A gasket 30 is arranged in the bottom of the socket 3. A metal washer 31 is provided and preferably arranged above the gasket so as to permit of the easy turning of the anchor plate as the sleeve is screwed down to place. The anchor plate has an extension 32 which extends through the gasket thus preventing the inward compression of the gasket in a manner to close the opening.

A spring 33 is secured to the plunger by being screwed onto screw threads 34 at the lower end of the plunger. The spring is also secured to the anchor plate being screwed onto screw threads 35. At the base of the screw threads on both the anchor plate and the plunger there is a groove 36 into which the end of the spring extends so as to lock the spring against unscrewing in the action of the gauge. A cap 37 is mounted in a screw-threaded base 38 and this base is screwed on the stem in the usual manner, the cap 37 being transparent so that the position of the plunger which is usually provided with a scale may be observed. The usual nut 39 is provided for securing the sleeve on the felloe of the wheel. The base 38 is clamped against this nut.

It will be observed that inasmuch as the plunger is locked with the sleeve by the key or detent 16 and the anchor plate is locked with the sleeve there is no twisting or turning of the tube or spring as the parts are assembled.

In the alternative construction the anchor plate 24 has a tapered end 24$^b$ which makes a tight fit in the opening 40 in the base 2$^a$. If this is carefully done a tight joint may be provided thus avoiding the necessity of the gasket.

What I claim as new is:—

1. In a tire stem pressure gauge, the combination of a head having an outwardly opening screw-threaded socket; a sleeve screwed into the socket; a plunger in the sleeve; an expansible tube secured to the plunger; and an anchor plate to which the tube is secured secured in the socket by the sleeve, said plate being locked against rotation relatively to the sleeve.

2. In a tire stem pressure gauge, the combination of a head having an outwardly opening socket having a screw-threaded wall, the bottom of the socket extending integrally inwardly from the screw-threaded wall; a sleeve screwed into the socket; a plunger in the sleeve slidingly mounted therein but locked against rotation; an expansible tube secured to the plunger; and an anchor plate to which the tube is secured secured in the socket by the sleeve, said anchor plate being locked against rotation relatively to the sleeve.

In testimony whereof I have hereunto set my hand.

HAROLD J. LE VESCONTE.